3,180,741
LIQUID POLYMERS, SOLID ARTICLES MADE THEREFROM AND METHODS OF PREPARING SAME
Eugene Wainer, Shaker Heights, and Bertram C. Raynes and Andrew L. Cunningham, Cleveland, Ohio, assignors to Horizons Incorporated, a corporation of New Jersey
No Drawing. Filed Nov. 29, 1960, Ser. No. 72,277
21 Claims. (Cl. 106—39)

This invention relates to inorganic polymers and more particularly, it relates to novel polymers in liquid forms, their preparation and to solid products prepared from such liquids. Specifically, it relates to high molecular weight polymeric liquids in single phase in which the major portion of such liquid is an inorganic moiety from which sheets, small diameter fibers in the form of continuous monofilaments and other solid shapes may be produced, preferably as transparent products.

Various techniques are known for producing solid products from inorganic melts, e.g. in the manufacture of glass and such products include not only sheets and shapes but also continuous filaments. As is known, the products are characterized by a fragility and brittleness which impairs their utility in many fields. Furthermore glass technology involves the preparation of melts at relatively high temperatures with attendant refractory and apparatus requirements.

In contrast thereto the solid products produced in accordance with the present invention are microcrystalline, flexible and may be prepared from liquids which operate as liquids at temperatures below 100° C.

One object of this invention is the preparation of high polymeric substances in liquid form wherein the liquid consists of a single and continuous phase in which the major portion of the polymer comprises a hydrous complex of a suitable inorganic oxide.

Materials which are effective in the practice of this invention are metals or combinations of metals whose salts produce hydrated oxides, more properly designated as hydrous oxides or hydrous oxide derivatives, as precipitates formed on neutralization of water solutions of such salts with alkalies. These precipitates form at a pH more acid than 7 and are not hydroxides. One distinguishing characteristic of hydrous oxides of the metals to which the present invention is applicable is that if the precipitate is thoroughly washed and is then dispersed in distilled water a pH of less than 7 will also be obtained. It is therefore proper to consider those hydrous oxides suitable for the preparation of the polymeric materials to which the present specification is addressed as weakly acidic hydrous materials.

Hydrous oxides which require alkaline conditions or a pH higher than 7 for their precipitation, or which in freshly precipitated and washed form and dispersed in water yield a pH higher than 7 are not effective by themselves in the practice of this invention. The acidic condition is the important limiting factor which thus enables combinations of materials to be utilized so that the sum total is acid in character, even though one of the ingredients forms an alkaline hydrate. For example, the alkaline earths by themselves will not fit the requirements, but when combined with acid hydroxides or hydrous oxides, the combination may be made to fit the requirement, providing there is sufficient excess of the acidic hydrous oxide. Specifically, zirconium fits the description very well, whereas calcium does not, but a combination comprising a mixture of the two in which the hydrous oxide of zirconium is a major constituent will meet the requirement and thus enable a fiber to be produced containing significant proportions of calcium oxide in its makeup by virtue of recognition of the limitation with regard to pH. The most acid of the elements to which the invention is applicable is titanium, and this will then accommodate substantially larger proportions of basic materials than the other elements listed below. Thorium is the least acid of the hydrous oxides in the list, and as a mattter of fact, it is a borderline case. One would have to operate with exceptional care in order to make thorium fully effective by itself. Additions of even small amounts of titania or zirconia will rectify this situation with regard to thoria.

The inorganic oxides constituting the principal portion of the polymeric products of this invention are therefore selected from the group consisting of the oxides of aluminum, titanium, vanadium, chromium, manganese, iron, cobalt, nickel, yttrium, zirconium, the lanthanide rare earths hafnium, and thorium, or in other words the oxides of aluminum, yttrium and the lanthanides, the Group IV–A metals (Ti, Zr, Hf and Th) and the metals having atomic numbers 23–28 inclusive, in other words, those metals and combinations of metals whose hydrous oxides are capable of being precipitated at a pH less than 7 on treatment with alkalies, and whose hydrous oxides or combinations of hydrous oxides when freshly washed and dispersed in pure water will yield a pH of 7 or less.

A further object of the invention is the preparation of stable polymers wherein the degree of polymerization is controlled.

Still another object of the invention is to provide means for converting the liquid polymeric materials described above into solid products of definite shapes such as sheets, slabs, and continuous monofilaments suitable for weaving to produce tough strong fabric products.

Still another object is to provide a means for producing fibers in the form of continuous monofilaments having a circular cross section, and which in the raw state may contain a minor proportion of an organic (carboxylic acid) salt and which, after firing at temperatures greater than those required to fully eliminate all such organic material, consists entirely of inorganic material of crystalline character in which the size of the individual crystallites is less than one micron.

It is a further object of the invention to provide high viscosity polymeric liquids starting from dilute water solutions of water-soluble metal salts of suitable carboxylic acids, and to produce solid products from such solutions by suitable heat treatment thereof, in a controlled atmosphere, said products being free from organic materials and glass formers and being characterized by a high degree of strength and flexibility.

These and other objects are accomplished in the manner and by the means more fully described below.

Briefly the method of this invention comprises the following sequence of operations:

(1) Preparation of a dilute aqueous solution of a water-soluble organic salt, i.e. a metal salt of a mono- or di-carboxylic acid including filtration or other clarification.

(2) Concentration of the dilute aqueous solution, preferably by vacuum evaporation, to a concentrate of which at least 50% by weight comprises an oxygen-containing derivative of the metal, such as a metal oxide, hydroxide or complex.

(3) Polymerization of the concentrate by suitable heat treatment.

(4) Formation of solid shapes from the polymer.
   (a) Continuous monofilaments
   (b) Sheets or slabs
   (c) Other shapes (short fibers, etc.) and (5) Final firing of the solid shapes to effect elimination of any organic material therein and to yield microcrystalline metal oxide products of high strength and flexibility. Each of these steps in the procedure will now be described more fully.

(1) PREPARATION OF DILUTE SOLUTION OF METAL SALT

The process of the present invention begins with the preparation of a dilute solution of a salt of a suitable carboxylic acid. Polyvalent metals to which the present invention is applicable are: aluminum, titanium, vanadium, chromium, manganese, iron cobalt, nickel, yttrium, zirconium, the lanthanide rare earths, hafnium and thorium. The metal is provided as a metal salt of an aliphatic monocarboxylic acid or aliphatic polycarboxylic acid, the dissociation constant of such acids being at least $1.5 \times 10^{-5}$. Salts of a single acid or of a mixture of acids may be used, provided the compounds are completely water soluble or are rendered soluble if sufficient acid is present.

Acetic acid and formic acid are preferred as the carboxylic acids to be used in the present invention, but the other acids which have been satisfactorily utilized with one or more of the above metals include oxalic, citric, adipic, itaconic, lactic and other mono- or polycarboxylic acids. Adipic acid is the preferred polycarboxylic acid. Each of these acids may be used alone or in admixtures with other members of the group.

Salts of substituted acids, e.g. ethoxyacetic, chloroacetic, etc. may also be used. The preparation of the dilute solution is readily effected by adding the water soluble salt to a sufficient volume of water, preferably at room temperature. Occasionally the addition of some of the carboxylic acid will be found useful in facilitating dissolution of the salt.

After the solution has been formed, it is freed of foreign solids and gases occluded therein by filtration or other known separation techniques to yield the completely clarified liquid solution required for the subsequent processing described below.

(2) PREPARATION OF CONCENTRATE TO BE POLYMERIZED

In order to produce the transparent solid products whether they are in the form of sheets, slabs, fibers or in the form of continuous monofilaments it is necessary to have available a clear polymeric liquid consisting entirely of a single phase containing a major proportion of a derivative of an oxide of the indicated metals. Furthermore it has been found that the liquid must still exhibit all the characteristics of a true liquid and particularly that it must be capable of being deformed through the application of even a minute applied force, and this must persist irrespective of the concentration of the hydroxyl-ion derivative or other metal oxide derivative present.

Novel polymeric liquids with the requisite properties are produced by concentration and heat treatment of the clarified dilute water solutions prepared as indicated above.

In order that the solution be readily polymerizable when subjected to a suitable heat treatment, it is necessary that such solutions contain at least 50% and up to about 90% of equivalent oxide by weight. Owing to the fact that this exceeds the solubility of the salt it is generally impossible to obtain compositions of this concentration consisting entirely of a single liquid phase by merely adding the required amount of salt to water. Instead, it is necessary to prepare a dilute solution in which the salt concentration does not exceed the solubility and thereafter to concentrate the solution by suitable techniques. A preferred method of concentrating the initial dilute solution prepared by dissolving the salt in water is to subject the solution to a vacuum at temperatures not exceeding 25° C. and preferably between 15° C. and 25° C. and to thereby effect evaporation and removal of the more volatile constituents, and simultaneously therewith concentration of the remaining liquid.

A less preferred technique which may be utilized comprises simultaneous concentration and heat treatment to completely eliminate any free water from the system while maintaining the polymeric character of the resulting solution.

Still a further technique which may be followed in the preparation of these polymeric materials comprises the addition of a freshly precipitated hydrous oxide derivative to an anhydrous solution of a carboxylic acid, whereby a metal carboxylate salt is precipitated which after separation, washing and drying may be redigested in additional anhydrous carboxylic acid at elevated temperatures. On standing at room temperature the resulting product is a polymeric liquid.

(3) POLYMERIZATION

Once the required highly concentrated liquid has been obtained by either vacuum concentration as described above or by heating the dilute solution to carefully controlled temperatures or by any other suitable technique which avoids the formation of a second phase, polymerization of the highly concentrated viscous solution is effected, preferably by heat treatment in a closed vessel at a temperature not exceeding 90° C. and preferably between 60° C. and 90° C. As a result of heating in this manner, the viscosity of the liquid rises rapidly and in less than one minute after the liquid has attained the specified temperature throughout its volume, the viscosity of the liquid has usually reached a value equivalent to a high degree of polymerization, e.g. to the formation of polymers having from 10 molecules to more than 10,000 molecules in the chain and having molecular weights of one million or more. When the volume of liquid being processed exceeds the small volumes handled in laboratory experiments wherein uniformity of temperature of the liquid is obtained by readily available techniques and the rates of diffusion throughout the viscous solution are somewhat less than in smaller volumes, between 2 and 20 minutes are required, once the liquid has reached a uniform temperature, for the viscosity to rise to the extent indicated.

As described above, it is also possible to obtain a polymer by evaporating the initially prepared dilute solution at a constant elevated temperature until a heterogeneous mass of gelled material is obtained, and thereafter permit the gelled material to stand, but this procedure has been found to be less satisfactory than the perferred technique described above, since it is more difficult to control the degree of polymerization by this method than by heating to between 60° C. and 90° C. as described above.

The degree of polymerization is primarily a function of the temperature at which the concentrated solutions are heat treated and to a much lesser extent it is also a function of the time at which the solutions are held at temperature. At the higher temperatures in the range indicated (60–90° C.) the degree of polymerization is affected by the duration of the heat treatment to a greater extent than it is at the lower temperatures in the range, or even lower temperatures.

While it might appear that simply heating the dilute solutions to concentrate them would in effect constitute a simultaneous concentration and heat treatment, such a process is not at all equivalent to the preferred two step procedure. The advantage of preliminary vacuum concentration at low temperatures (15–25° C.) followed by heat treatment at higher temperatures (60–90° C.) is the fact that the equivalent concentration of oxide in the liquid can be pushed to much higher levels without deleterious side effects. In some instances this value may reach as high as 90%. In contrast, when simultaneous concentration and heat treatment are practiced, about the maximum concentration of oxide in the liquid which can be achieved without the formation of second phases of irreversible characteristics, such that they will not revert to purely liquid form on standing, is a value equivalent to about a 60% concentration of oxide in the liquid. Thus not only can closer control of molecular weight be obtained through the technique of vacuum concentration and subsequent heat treatment, but also a much higher concentration of the oxide may be obtained in the liquid without the development of extraneous phases, and as a consequence a much higher degree of polymerization and molecular weight can also be obtained by the preferred procedure.

In summary then three separate and distinct methods exist for the preparation of the polymeric liquids of this invention. The first, and most preferred technique, is vacuum concentration followed by heat treatment. The second is simultaneous heat treatment and concentration and the third is the preparation and thermal treatment of specific hydrous oxide products digested in glacial acetic acid, as described more fully below.

The following example further illustrates the preferred embodiment of this invention.

A solution of zirconium acetate in water, containing the equivalent of 11% zirconium oxide by weight and having a viscosity of between 2 and 4 centipoises was vacuum concentrated at 25° C. for 36 hours at which time it exhibited the equivalent of a zirconium oxide concentration on a weight basis of 82%, and a clear somewhat mobile liquid having a viscosity of 8500 centipoises was obtained. Measurements indicated that a polymer had been produced, exhibiting a molecular weight of approximately 1000, indicating that the polymer was composed of units containing 8 to 10 molecules in the chain, on the basis that the unit is comprised of recurring elements of the formula $ZrOOH^+$ with regularly inserted radicals of acetic acid to maintain the stability of the chain. Fibers of several inches in length and of exceptionally fine diameter were pulled from such a solution by inserting a stirring rod and, after a drop has formed, pulling the stirring rod slowly and continuously from the solution. On vacuum concentration to levels somewhat lower than about 80% of equivalent oxide, fiber pulling by the same technique is so difficult that from a practical standpoint it is useless. On the other hand, if a simultaneous concentration and heat treatment technique at about 80° C. is utilized, fiber pulling starts to become specifically evident at liquid concentrations of the order of 50% equivalent zirconium oxide by weight, and it is clear that a somewhat different product has developed as compared to similar solutions which have been only vacuum concentrated at the lower temperature.

Referring now to the vacuum concentrated solution which had reached a level of 82 weight percent equivalent oxide, when such solution was allowed to stand at 25° C. for one week the viscosity slowly rose and reached a value of the order of 20,000 centipoises and suitable measurements indicated that the number of molecules in the polymer chain is now of the order of 25. Fibers were spun much more readily from such a solution than the fresh concentrated solution originally prepared, indicating that the increase in chain length has facilitated spinning of the fibers. When a sample of the same 82% solution was heated in a closed container at 80° C. for 10 minutes, immediately after vacuum concentration, a permanent viscosity in clear mono-phase liquid form of the order of 350,000 centipoises was achieved from which fibers were spun or tension drawn with great ease. When a similar sample of the freshly concentrated 82% solution was heated at 80° C. for two hours, the viscosity reached a value of the order of $0.5 \times 10^6$ centipoises to $1.0 \times 10^6$ centipoises, while still a pure liquid. Hydraulic pressure accompanied by tension on the freshly formed strand was then required to produce a continuous mono-filament. Molecular weight determinations indicate that polymers having chain lengths of at least 10,000 molecules have been obtained in periods of two hours or less by heat treating the concentrated solutions at temperatures between 80 and 90° C. Heat treatment for periods up to two hours of such highly concentrated solutions at temperatures in the range of 70 to 80° C. yielded polymers having chain lengths of the order of 1,000 to 10,000 molecules in the chain, whereas heat treatment above 35° C. and below 70° C. for periods of a few hours of such highly concentrated solutions will yield molecules having chain lengths between 100 and 1,000 molecules per chain. The number of molecules or molecular units in a chain is a function of the temperature at which the heat treatment is carried out, and the time of heat treatment is primarily effective in establishing the total number of such chains of equivalent molecular size.

It has been pointed out earlier that the concentrate produced by a combined heat treatment and concentration followed by standing at room temperature in a closed container to stabilize the liquid normally cannot be brought past a concentration in the liquid of about 60% equivalent oxide because solids are produced which apparently represent irreversible phases which do not pass into solution above this level of concentration on standing. The viscosity of such a solution is about 450,000 centipoises and molecular weight determinations indicate that the molecule is again represented by a polymer having a chain length of at least 10,000 molecules. From the above, it will be seen that temperature in large measure determines the molecular weight of the polymer formed, and the concentration of the oxide simply establishes the amount of polymer which is produced, even though of the same chain length. There is some evidence that the constitution of the recurring monomer units will differ depending on the concentration at which the heat treatment takes place for the formation of the polymer; such indications will be given in later portions of this description.

To avoid the formation of extraneous second phases in liquids after concentration for specific times and temperatures, it has been found to be advisable to accomplish such heat treatment in sealed containers or at least in an atmosphere of an aliphatic carboxylic acid, preferably of the acid of which the salt is composed. Atmospheres of pure acetic acid or pure formic acid have been found to be most effective in overcoming any latent tendency to produce second insoluble phases which represent deleterious impurities.

Spinning concentrations for a modified zirconium acetate solution may be varied from about 65% by weight of equivalent zirconium oxide up to almost 90% by weight of equivalent zirconium oxide with the pure liquid characteristics still being maintained, but the concentration of equivalent oxide in the solution relative to the residual organic acid content determines the nature of the unit recurring in the formation of the polymer as a function of subsequent heat treatment. The constitution of the monomeric unit determined by determination of the relative concentrations of equivalent oxide versus acetate radical over this range of spinning concentrations indicates that the individual monomeric unit may vary from a relative proportion of equivalent oxide to acetate unit of 2:1 up to 4:1 in the case of zirconium. This same ratio has been found to obtain generally for quadrivalent metals. The longer the individual monomer length prior to spinning the more readily are threads and transparent sheets produced. It appears that the monomeric units are comprised of fixed whole number ratios such as 2:1, 3:1, and 4:1 and that concentrations between the amounts represented by these ratios may be comprised of mixtures of monomers exhibiting such ratios.

In the case of the trivalent metals such as aluminum, chromium, iron, and the like, similar conditions obtain. Again the first evidence of fiber spinning characteristic is obtained at a viscosity of approximately 10,000 centipoises or more. With the oxides of the trivalent metals, the unit forming the polymer chain may vary from a ratio of 2 moles of the oxide to 1 mole of the acid radical up to 8 moles of the oxide to 1 mole of the acid radical. In view of the fact that there are two metal atoms in each of such oxides, the ratio of metal atom to molecule of acid radical is twice those given. Again, the degree of formation of a chain is a function of the temperature of heat treatment and the nature of the chain with respect to the ratio of metal oxide to acid radical is a function of the concentration of the equivalent metal oxide in the solution prior to the onset of polymerization. Though it is difficult to define the individual components with certainty in the case of aluminum oxide, the successive ratios which may be produced as a function of the concentration of the solution will cover 2, 3, 4, 5, 6, 7, and 8 moles of equivalent aluminum oxide per mole of carboxylic acid radical.

Thus, for those oxides whose stable form takes the formula $RO_2$, the ratio of equivalent $RO_2$ oxide in the polymeric liquid to the amount of organic acid present with respect to the form of the monomer unit making up such polymer will cover the range from 2 moles of $RO_2$ oxide to 1 mole of organic acid radical up to 4 moles of $RO_2$ oxide to 1 mole of organic acid radical. In those cases where the oxides have the formula $R_2O_3$ in stable form such as aluminum oxide, the ratio of the polymeric liquid with respect to the form of monomer making up such polymeric chains will cover the range 2 moles of equivalent $R_2O_3$ oxide to 1 mole of organic acid up to 8 moles of equivalent $R_2O_3$ oxide to 1 mole of organic acid. These units then represent the building blocks for the polymer chain and it appears that the higher the ratio of equivalent oxide initially present the higher the viscosity and the higher the degree of polymerization.

While we do not wish to be bound to any specific theory, it appears that the building block for the monomeric unit is a positive hydroxylated ion of the metal oxide. In the case of zirconia, this ion will have the formula $ZrOOH^+$. These are believed to be strung in the form of chains and the terminal group at either end of the chain is an acetate radical. The number of zirconyl hydroxide units in each monomeric chain may vary as heretofore described with the number of acetate radicals for each monomeric unit remaining the same, so as to account for the variation in length. While these units have been designated as monomers, in all probability it is more proper to consider that the monomeric unit is represented by the positive ion whose formula has been given above, and that the individual units prepared as a function of concentration prior to heat polymerization are, in actual fact, small chain length polymers. Since an acetate radical exists at either end of the chain on a symmetrical basis, the actual number of zirconyl hydroxyl units in the lowest ratio would be four substituents of such zirconyl hydroxyl unit to two substituents of acetate, giving an overall ratio of 2 moles of zirconium oxide to 1 mole of acetic acid on an equivalent basis. There is considerable experimental evidence indicative that these small unit chains are more properly characterized as small polymers rather than individual monomer units. As described above, on straight vacuum concentration prior to heat treatment, the minimum concentration at which fibers could be spun was approximately 80%, equivalent to the ratio of 2 moles of zirconium oxide to 1 mole of acetic acid. However, when a simultaneous concentration and heat treatment was utilized, fibers were spun from fully polymerized masses containing as low as 50% zirconium oxide on an equivalent weight basis in the solution. The extraordinarily high viscosity of the liquid was evidence of the high degree of polymerization. The behavior of the heavily polymerized liquid of this 50% concentration on dilution with water on the one hand as against dilution with anhydrous acetic acid on the other gives a clue to the situation. When water is used as a diluent, the viscosity drops very precipitously and the change in viscosity which takes place even on the addition of a minor amount of water indicates that a pronounced depolymerization has taken place. When freshly distilled acetic acid in substantially water-free condition is used as the diluent in the same volume of addition, the drop in viscosity is very much less and relatively dilute solutions using acetic acid as the diluent exhibit much higher viscosity than a comparable concentration of polymerized oxide material than when diluted with water. Consequently this behavior on dilution with pure acetic acid, even though the salt is still water soluble, is believed to be indicative of high polymer formation, of the depolymerization effect of water itself, and of the nature of chain formation and of the polymerization process itself.

The formation of the high polymer as the result of heat treatment appears to be due to the splitting off of anhydrous acetic acid or other aliphatic carboxylic acid present at the terminals of the original molecule, resulting in a substantially indefinite lengthening of the chain with a consequent slight drop in viscosity as the result of dilution with the anhydrous acetic acid split off by heat. This may not only explain why the relatively low concentration equivalent to 50% equivalent zirconium oxide by weight is capable of forming polymers, but also indicates that at this concentration free water is presumably no longer present, and the diluent at this level and above is anhydrous acetic acid. In view of the presence of acetic acid as a diluent in the polymeric liquid itself, it is difficult to determine whether the fully polymerized material exhibits a comparable structure as the original building block, except extended in length with respect to the number of zirconyl hydroxyl units. Indicative that no more than a few acetate radicals are present in the chain even though heavily polymerized is the fact that, as the temperature is raised after formation of an essentially solid shape and before active carbonization takes place, the number of acetate substituents continues to drop and finally levels off asymptotically.

The particular carboxylic metal salt used for the purpose of preparation of these polymers will vary depending on the metal in question. In the case of zirconium, the preferred metal salt is the water soluble acetate which exhibits the ratio of 2 moles of acetate radical to 1 mole of zirconium oxide, sometimes designated as diacetozirconic acid. The zirconium acetate commonly designated as monoaceto-zirconic acid containing a ratio of 1 mole of zirconium oxide to 1 mole of acetate radical would exhibit in the free-water condition an equivalent oxide content of approximately 67% and is insoluble in water and only sparingly soluble in acetic acid. Yet by the techniques which have been described thus far, it is possible to produce a single phase liquid without any manifest precipitate present, such liquid being stable for an indefinite period and containing up to as high as approximately 90% equivalent zirconium oxide by weight, the balance being presumed to be some form of acetic acid.

In the case of the trivalent metals such as aluminum, iron, chromium, nickel, manganese, and the like, the formate is the preferred species and it is generally preferable to add up to 5% of the formic acid content of a polycarboxylic acid such as adipic. In the absence of adipic acid, it is difficult to prevent precipitation on simultaneous heating and concentration, though this defect does not develop in vacuum evaporation at room temperature. The salt used in every case as the starting material is the one which contains the lowest content of acid radical with respect to metal oxide needed to produce a water soluble solution at room temperature. Usually this is the salt which contains 1 mole of equivalent oxide to 2 moles of the acid radicals.

Titanium is something of a special case. The tetravalent, fully oxidized titanium material is difficult to produce in stable form at relatively low concentration, in view of the fact that precipitates containing titanium tend to form at relatively low temperatures and at low dilutions, such precipitates being of irreversible nature with respect to solubility, and as a consequence, constitute a deleterious second phase. However, two artifices may be utilized for the elimination of this defect. If trivalent titanium is used, it then may be treated as though titanium is acting as a trivalent element, and in this case, combinations of formic acid with a small amount of a polycarboxylic acid such as oxalic or adipic makes it possible to produce the high concentration polymer without formation of said insoluble phases, providing the evaporation is carried out without access of air so as to prevent oxidation. Tetravalent titanium salts may be used if a somewhat different technique is utilized. This involves mixing 1 mole or 190 grams of anhydrous titanium tetrachloride with 2 moles or 120 grams of glacial acetic acid and stirring until solution is complete. Two moles of water are added slowly and with care, this comprising 36 grams, and a clear solution is still maintained, equivalent to approximately 23% titanium dioxide by weight. Such a solution is then vacuum evaporated to at least half its volume at 15° C. and preferably to a factor of half to one-third its original volume, thus doubling to tripling the titanium oxide concentration and yielding concentrations of approximately 50% titanium dioxide or higher. The solution may now be heat treated to produce a mono-phase liquid polymer without precipitation of irreversible phases after being brought up to concentrations of titanium dioxide in a liquid phase by the continued vacuum evaporation prior to heat treatment to levels of the order of 80 to 85%. If these solutions are treated by simultaneous evaporation and heat treatment techniques, the alternative procedures described in the foregoing, irreversible hydrolysis tends to take place at levels below a concentration of titanium dioxide in the liquid of the order of 50%. As a consequence, the only technique which can be utilized for titanium involves vacuum concentration at a temperature of 15° C., followed by short time heat treatment for polymerization purposes. Addition of a small amount of a polycarboxylic acid such as oxalic or adipic represents a further stabilizing influence with respect to hydrolysis in the heat treatment.

As has been pointed out previously, generally the preferred treatment of these water soluble salts irrespective of starting composition is vacuum concentration at temperatures in the range of 15 to 25° C., followed by heat treatment in closed containers at a chosen temperature in the range of 70 to 90° C. Vacuum concentration is normally carried out until the equivalent oxide content reaches a level between 75 and 90% equivalent oxide by weight. The lower molecular weight oxide represents the concentrations which can be produced to the lower levels of this range, and the higher molecular weight oxides represent the concentrations which may be produced at the higher levels of this range. If simultaneous evaporation and application of heat is utilized, said heat being in a temperature range of 60 to 80° C. the maximum concentration normally which is achieved is approximately 60% equivalent oxide by weight before difficulty is experienced with insoluble phases which do not pass into solution on long standing. It is thus preferable to use the technique involving first evaporation to extremely high concentration followed by heat treatment. If dilution is required to produce polymeric materials more amenable to handling at later stages, such dilution is carried out with anhydrous acetic or anhydrous formic acid.

(4) FORMATION OF SOLID PRODUCTS

The liquid polymeric shape-forming materials from which solid shapes are to be formed are produced under conditions such that they are not exposed for any lengthy period of time to either water or water vapor. These polymeric liquids may be utilized to produce transparent to translucent sheets, slabs, shapes, fibers, and, most important, thin strong flexible monofilaments of indefinite length capable of withstanding very high temperatures and such monofilaments may be utilized to produce the type of threads which can be woven into fabric. In producing such slabs and fabrics, intermediate stages of heat treatment still yield relatively strong structures, at which stage of intermediate heat treatment a shape can be produced by lamination or weaving. Continuing the heat treatment to its ultimate stage will produce an organic-free, transparent to translucent object in strong, tough condition. When properly fired, these objects and particularly the fine diameter monofilaments exhibit no evidence of macroscopic crystallinity. X-ray determinations indicate that the fibers are crystalline in nature, and hence the individual crystal size is submicroscopic. In order to achieve this state of evident lack of macrocrystals, the formation of premature incipient nuclei from whatever source must be eliminated from the polymeric solutions from which the shapes are to be formed. Casual dirt, air bubbles, and water itself represent such deleterious materials in certain stages of preparation. Of these, water is by far the most critical. It has been indicated previously that water is a depolymerizing agent and its adverse and depolymerization effects are most pronounced at the highest levels of polymerization. High concentration polymerized materials are somewhat hygroscopic, and if freshly formed shapes are handled in such a way as to be deliberately exposed for relatively short intervals of time to normally humid atmospheres, the shape develops opacity on firing and the fired material is weak and brittle. For example, when the thread produced from a freshly polymerized batch of high polymer is immediately heat treated under the conditions to be specified hereinafter, a transparent, tough, flexible monofilament is obtained as the result of ultimate heat treatment. An examination under the microscope reveals no obvious evidence of crystallinity or nucleation. If the same filament is allowed to stand in air for 10 to 15 minutes before firing, the identical heat treatment produces a fiber which is almost opaque, even though the thread has a very small cross section. The opacity appears to be due to a combination of opalescence and the presence of discontinuous phases. This material is extremely brittle and must be handled with care to prevent breaking it up into fragments.

The desired condition of transparency, toughness, and flexibility in the continuous monofilaments may be obtained by heat treating the specimen in a somewhat drastic manner immediately after formation, with or without the use of specially controlled atmospheres. In forming shapes such as continuous monofilaments from suitably prepared polymeric materials, temperatures above the boiling point of the highest boiling constituent in the filament are applied immediately after formation of the filament, followed relatively quickly by final treatment at temperatures above red heat. In those cases where relatively massive structures are made, having a substantial thickness, it is not possible to apply the heat with the rapidity used for thin films and fibers, for example, in view of the possibility of forming gases which will disrupt the structure. As a consequence, the heat treatment of more massive articles is carried out more slowly but in an atmosphere of vapor of acetic or formic acid, the former acid being preferred, and such heat treatment is carried out just below the boiling point of the respective acid in question. Heat treatment is then continued slowly up to the point where manifest cracking of the organic acid radical starts to take place and still in the controlled atmosphere. After a temperature of organic acid cracking has been reached, final firing may then be completed without the need for controlled atmospheres. Cracking of the organic acid utilized for the purpose will generally start slowly at about 200° C. and become pronounced at temperatures of the order of 350 to 450° C.

Another technique which may be utilized both for the preparation of thin films and for the manufacture of thick cross sections is to heat the specimen gently while it is supported on a temperature resistant, water repellant surface such as a fluorinated plastic or a molded silicone surface, the heating being effected at a temperature slightly above the boiling point of the respective acid used in the metal salt preparation, such evaporation taking place in an atmosphere of anhydrous acid. This treatment is continued until the solid articles reach a constant weight. While thick sheets may be made directly by this procedure if the heat treatment is applied slowly and gently, it is preferable to make up such thick sheets by preparing a number of thin sheets under the described conditions and after weight stability has been achieved to allow the temperature to drop below the boiling point of the acid in question, while the specimen is still immersed in the atmosphere of its vapor, and then place one of the thin sheets on top of the other in the controlled atmosphere chamber. Under these conditions, cementing takes place without the intrusion of air and moisture, and as a result of the continuing heat treatment to the cracking temperature in the atmosphere of the anhydrous acid in question, cementation without the development of opacity is obtained.

Fibers or continuous monofilaments may be produced in a variety of ways. The two procedures found to be most desirable were: (1) pulling the fiber against its own weight from a fully polymerized liquid and thereafter immediately subjecting the freshly pulled fiber to heat treatment to yield the fiber in its final state and (2) extruding a polymerized liquid through a relatively large size orifice and rapidly attenuating the thread, using the material being extruded from the orifice as a constant feed. In the combined extrusion-tension technique of preparation, fibers of extraordinarily fine diameter of indefinite length have been produced. When pulling from a solution, the maximum length of fibers that have been made in this manner generally did not exceed a few feet before the attenuation is sufficient that the fiber pinches itself off. In the extrusion-tension technique, fiber or filament production rates of several feet per second are readily possible and diameters of fiber which are obtained in monofilament form may vary from approximately 0.5 microns up to several tens of microns, the diameter being most generally a function of the speed of attenuation.

In such extrusion-tension formation, pressure between about 1 and 50 pounds per square inch is applied to a hydraulic cylinder containing the fully polymerized water-free liquid, depending on the viscosity and degree of polymerization of the liquid polymer utilized. The orifices are of the order of 25 to 50 microns in diameter as a minimum value and may extend up to 10 times the values indicated by these ranges, depending on the thickness of the fiber which is desired. Immediately the fiber starts to extrude, it is grabbed with an appropriate tool and pulled directly into a graded hot zone maintained with an entry temperature of about 120° C. to 200° C. and an exit temperature of about 600° C. The length of this graded temperature zone will vary with the speed of attenuation. At speeds of the order of one foot per second, the zone need not be longer than about 12 inches in length, and at speeds of the order of 10 feet per second, the zone needs to be approximately 3 feet in length with the last half of such zone maintained at the top temperature of this preliminary heat treatment. Immediately after passing through such zone, the continuous monofilament may be wound on a mandrel, if desired, and stored in a completely dry atmosphere. At this stage, the fiber has a considerable degree of strength. Also at this stage, if heat treatment is continued with one fiber in contact with another, cementation and self-bonding will take place. However, rather than storing the intermediate heat treated monofilament, it is preferable to pull the fiber through a firing furnace at the same rate utilized in attenuation. The firing furnace is maintained at a temperature at which full consolidation of the fiber is achieved and all organic material is eliminated. After firing, the fiber is wound on a spool ready for spinning.

The temperature of firing depends on the oxide or mixture of oxides being processed. In the case of zirconium oxide, aluminum oxide and chromium oxide, minimum temperature for final consolidation and elimination of all organic material is approximately 2200° F. and such consolidation temperatures may extend to 3000° F. For the oxides of metals such as iron, manganese, nickel, cobalt, and titanium, the temperatures employed for ultimate consolidation are generally in the range of 1800 to 2000° F.

It is also possible to complex or stabilize the oxide products by the addition, before firing, of minor amounts of specific compounds useful for crystal stabilization purposes or modifications of properties. For example, small amounts of lime (CaO) may be incorporated in the zirconium oxide polymer for the production of a cubic structure in the fired article, produced from an initial monoclinic structure. Other additives may be used to achieve the formation of ferrites from a ferric oxide base. The addition of minor amounts of alkaline earths to titanium for the preparation of ferroelectrics represents still another modification of the process.

The monofilaments produced from the lower levels of vacuum concentration tend to be slightly more brittle and slightly more opalescent than those produced from higher levels of vacuum concentration. For example, the strength of the fiber produced from a polymer of an 89% Zr concentrate is substantially higher and the transparency is substantially more complete with little or no opalescence being exhibited than the strength and transparency of fiber produced from an 82% Zr concentrate from zirconium acetate.

Having described our invention, the following examples are intended to illustrate preferred modes of practicing the same and are not to be construed as limitative.

*Example 1*

Ten liters of zirconium acetate solution containing approximately 11% zirconium oxide by weight was clarified by filtration and was placed in a wide-mouth Pyrex beaker. A vacuum strength bell jar was placed over the beaker and the bell jar sealed to a stainless steel plate suitably fitted with outlets for evacuation purposes. A vacuum equivalent to about 15 millimeters of mercury was first applied and as the concentration and evaporation at a temperature of approximately 25° C. proceeded, the degree of vacuum was increased over a period of the first 4 hours to a value of approximately 1 millimeter of mercury and continued for approximately 20 hours. At this point, chemical analysis and gravity determination established that a concentration equivalent to 82% of zirconium oxide on a weight basis had been reached, and the viscosity of the solution immediately after preparation was approximately 8,500 centipoises.

The concentrated material in its beaker was removed from the vacuum chamber. A stirring rod was dipped into the viscous liquid and said viscous liquid was permitted to drop from the stirring rod. This produced an extremely fine filament which slowly solidified on exposure to air.

The beaker was covered and was immediately immersed in a constant temperature bath maintained at 80° C., so that the level of liquid in the beaker was substantially below the level of the constant temperature bath. After the temperature had again stabilized at 80° C., (after insertion of the beaker and its contents into the constant temperature bath) heat treatment was continued for 10 minutes. An exceptionally viscous, transparent material which appeared almost solid in its macroscopic characteristics but which showed minutely the flow characteristics of a liquid had been produced. This material was allowed to cool while still covered, and when cold was scooped into the barrel of a hydraulic extrusion chamber having an extrusion orifice of 10 mils in diameter. After the barrel had been filled, it was covered with the watch glass before the plunger was inserted. The material was allowed to stand for 30 minutes so as to permit all air bubbles to rise to the top. Pressure was then applied initially at a rate of a few ounces per square inch and eventually at a rate which stabilizes in the region of 5 to 7 pounds per square inch. The viscous material which first extruded from the barrel at the low pressure was grabbed in forceps and pulled slowly through a heating zone approximately 3 feet in length. The material first entered the top third of the heating zone, maintained at a temperature of 200° C., then it entered the middle third, maintained at a temperature of 400° C., and was then pulled through the bottom third, maintained at a temperature of 600° C. The furnace was capable of being opened on hinges throughout its entire length to permit the initial insertion of the fiber. After emerging from this first heating zone, the heat treated fiber had a brown-black color. The fiber was brought out into the air and passed around a six inch diameter pulley made of glass. One complete turn was taken around the pulley for anchoring purposes. The fiber was then brought into a furnace of tubular construction in which the tubular hot zone was 2 inches in diameter and 3 feet in length and again fitted with hinges so that the furnace could be opened to permit the insertion of the full length of the fiber. This furnace was maintained at a temperature of 1250° C. After emerging from the furnace, the fiber was wound under tension on a mandrel. Under the microscope the fiber appeared almost transparent with a very slight opalescence. The individual filament was approximately 6 microns in diameter. After achieving a steady state of extrusion and attenuation, the extrusion speed proceeded at a rate of 10 to 12 feet per minute and the rate of attenuation of the very thick column, relatively speaking, being attenuated from such an extrusion orifice finally reached levels of 8 to 10 times that of the extrusion rate so as to permit the diametral reduction available as the result of forming the fiber under tension.

*Example 2*

The same preparatory procedure is followed as in Example 1 except that the vacuum evaporation was continued until chemical analysis and specific gravity determinations indicated a concentration of zirconium oxide on a weight basis, equivalent to approximately 89% of such oxide. After heat treatment at 80° C. under the same conditions as described in Example 1 for a period of 30 minutes, the extremely stiff "liquid" product was spooned into the barrel of a hydraulic cylinder and allowed to stand for 4 hours so as to eliminate air bubbles. A 20 mil extrusion orifice was used. On reaching a steady state condition of extrusion, pressures required to maintain a feed rate of 200 feet per minute of extrusion were in the range of 20 to 25 pounds per square inch. The fiber formed at a rate of attenuation and tension of approximately 20 times that of the stabilized extrusion rate produce a monofilament after firing exhibiting a diameter of approximately 3½ microns. Using a polymeric material prepared as indicated in this example, the diameter of the finished fiber produced may be varied in accordance with the rate of tension attenuation. Practical limits of operation yielded diameters between 2 and 10 microns for the finished fiber. Fibers exhibiting diameters between 0.5 and 2 microns may be made with similar rate of attenuation by changing to an extrusion orifice approximately 5 mils in diameter.

*Example 3*

One hundred grams of the fully polymerized, stiff "liquid" as produced in Example 2 was diluted with 300 cc. of glacial acetic acid at 25° C. and stirred until solution was complete. A somewhat viscous liquid is obtained. This solution was then poured on a slab of polished fluorinated polymer designated in the trade as Teflon. The plastic plate supporting the film of liquid was placed in the bottom of a beaker. The plastic plates were separated from the bottom of said beaker on stilts of Teflon ½ inch high. Fifty cc. of glacial acetic acid were also placed in the bottom of the beaker. The contents of the beaker were then heated from the bottom in a constant temperature bath comprised of a heated wax so as to maintain the temperature at 105° C. until all of the acetic acid which had been added to the beaker had evaporated. Immediately thereafter the slab with its now apparently dry film of transparent material was placed in an oven which had been heated previously to 200° C. The oven temperature was maintained at this level while acetic acid was distilled into the heating zone. While on its Teflon slab in the oven, the film was held in the acetic acid atmosphere at 200° C. for 30 minutes. While still hot, the film which was now loose and exhibited a substantial degree of strength was removed from the plastic surface with a pair of forceps and transferred to a polished quartz surface placed in the oven. Fired alumina plates may be used instead of the quartz. The temperature of the oven was then increased to a range between 450 to 500° C. while still distilling acetic acid vapors into the hot zone. After maintaining the film at this temperature for about 30 minutes, the flow of acetic acid vapors was shut off and the heat treatment was continued for 20 minutes longer. The film was now brownish-black. The film was immediately inserted into a furnace, wherein it was heated in air at 1250° C. and maintained at this temperature for 30 minutes. On removal from the furnace and cooling, a transparent, almost water white, with a faint yellowish tinge, flat film was obtained having a thickness of 27 microns. The thickness of the original liquid film cast on the Teflon was about 3 times this thickness. The actual film which was processed in the manner described was approximately 4 inches square, being 2 inches on an edge.

*Example 4*

Four films produced as described in Example 3 were placed one on top of the other while at the 200° C. stage and while the atmosphere of acetic acid was maintained. Each period of heat treatment was doubled and a sheet of transparent zirconium oxide, free from bubbles, cracks, opacity and obvious crystallinity, approximately 4 mils in thickness was obtained at the end of the cycle. A very faint opalescence was evident in the product.

*Example 5*

Twenty grams of adipic acid were added to 10 liters of a solution of aluminum diformate containing approximately 10 grams of aluminum oxide per hundred grams of solution. This solution was then vacuum concentrated as described in Example 1 over a period of 24 hours. The thick liquid obtained was equivalent to 86% aluminum oxide by weight as determined by specific gravity and chemical analysis. The same procedure as described in Example 1 was then applied to this liquid except that the time of polymerization at 80° C. was 20 minutes. The temperature of the first heating zone after extrusion from the filament forming orifice was maintained at 120° C. rather than at 200° C. A water white transparent filament of round cross section and having a diameter of 2.7 microns was obtained as the result of the final firing at 1250° C.

*Example 6*

The same materials and procedures as defined in the previous example were utilized except that the raw materials were complexed by the addition of 200 cc. of a 10% solution of chromium diformate to the solution of aluminum diformate. After firing at the final temperature, a transparent fiber of approximately 2.7 microns diameter was achieved in continuous monofilament form. The fiber had a pinkish red color. X-ray examination of the products made both in this example and the previous example indicated that the main constituent was alpha alumina, or corundum. The pinkish red fiber made in this example was comparable in its crystalline form and color to ruby.

*Example 7*

The same materials and procedures set forth in Example 5 were utilized except that 200 cc. of a 10% solution of cobalt acetate were added to the raw materials. Thereafter the solution was concentrated, polymerized, and formed into a continuous monofilament fiber as in Example 5. This fiber was blue in color and again X-ray examinations established that it was alpha corundum, thus being comparable in the main to the structure and color of natural sapphire.

*Example 8*

Ten liters of a 10% solution of chromium diformate were prepared and 20 grams of adipic acid added to such solution. After clarification by filtration, this solution was vacuum concentrated as indicated in Example 1 over a period of 40 hours to yield an extremely viscous, greenish-violet colored liquid containing approximately 90% chromium oxide by weight. The clear liquid was processed as in Example 1 for the preparation of continuous monofilaments using a 20 mil orifice and with speeds identical with those given in Example 1. The temperature for initial heat treatment immediately after extrusion and during attenuation was 120° C. prior to achieving the higher temperatures for final consolidation. A monofilament having a diameter of 6 microns and of circular cross section was obtained after firing at 1250° C. and the color was green, the filament being transparent.

*Example 9*

A significant increase in the toughness of the chromium oxide fiber and with the development of a yellowish green color was achieved as compared with the fiber of Example 8, through the elimination of the adipic acid addition, and the addition of 800 cc. of a calcium formate solution to the 10 liter batch to produce a solution containing 6% calcium oxide by weight.

*Example 10*

Freshly precipitated carbonated hydrous oxide of zirconia was prepared in the following manner: 1 mole of zirconyl oxychloride octahydrate is dissolved in 1500 ml. of distilled water. One mole of ammonium carbonate is dissolved in 1500 ml. of distilled water. The zirconium chloride solution is added to the carbonate solution with vigorous stirring. The pH of the resultant mixture is adjusted to 5.5 if it does not reach this value directly. The slurry is stirred vigorously for fifteen minutes at room temperature. The product, carbonated hydrous zirconium oxide, is filtered and washed with limited amounts of distilled water until the filter cake is free of chloride ion as determined qualitatively with a 1% silver nitrate solution. The filter cake is sucked "dry" on the filter and stored in sealed polyethylene bags. The zirconia content of the material is determined on each batch.

One mole of the freshly precipitated hydrous oxide was added to 1 mole of glacial acetic acid at room temperature and stirred vigorously for about 20 minutes. As a result a smooth, white, somewhat granular, precipitate was obtained which is completely insoluble in water and in the mother liquor. It appears to be zirconium monoacetate and is quantitatively formed by the technique described.

The precipitate was separated from the motor liquor by filtration, then washed with a 1% solution of acetic acid and then with distilled water. The washed residue was dried at 100° C. The resulting dried product was digested in glacial acetic acid at 60° C. to 80° C. to form a gel. On standing for between 24 and 48 hours, a polymeric liquid is obtained. Between 0.1 mole and 0.5 mole of glacial acetic acid may be used for each mole of zirconium monoacetate.

The resulting polymeric liquid was converted to solid products by the techniques described in Examples 1 and 2.

*Example 11*

A solution of zirconium acetate in water, containing the equivalent of 11% zirconium oxide by weight was placed in a container wherein the surface exposed was approximately equal to the depth of the liquid. The solution was evaporated with some agitation at 80° C. until the liquid had reached a concentration equivalent to a zirconium oxide content of between 60% and 62%. The material was then a thick gel with a large amount of gas bubbles trapped in the gel. The container was removed from the evaporation and heat-treating zone, covered and then allowed to stand at room temperature for 48 hours. The resulting liquid was free from air bubbles and gel and exhibited a viscosity of 450,000 centipoises and a chain length of the order of 10,000 molecules. It was readily processed into fibers by drawing or extrusion and pulling.

In the above description wherever reference is made to concentration in the polymeric liquid this is not intended to imply that the oxide itself is present in the liquid. It appears that the metal is present as a hydrous derivative of the inorganic oxide. Hence the term "equivalent oxide" is deemed preferable and is intended to indicate that if a sample of the liquid is taken and subjected to analysis, the stated percentage would be reported as the oxide of the metal in question.

Having now described the invention in accordance with the patent statutes, we claim:

1. A process for producing a clear single phase liquid polymer containing at least 50% by weight of the oxide of a metal selected from the group consisting of metals whose hydrous oxides are precipitated at a pH more acid than 7 on treatment of aqueous solutions of salts of said metals with alkalies, which precipitates yield a pH of less than 7 after washing and dispersion in distilled water, which clear liquid polymer exhibits a viscosity at room temperature of at least about 8500 centipoises, and from which solid inorganic polymer products may be prepared which comprises: dissolving a water-soluble metal salt of a metal of said group and of an aliphatic carboxylic acid in water; clarifying the resultant solution to thereby remove extraneous undissolved solids and gases therefrom; thereafter subjecting the resultant clarified solution to vacuum evaporation while maintaining the temperature of the solution in the temperature range of 15° C. to 25° C.; and continuing the vacuum evaporation of said solution, for removal of volatile constituents until the resulting concentrate contains the equivalent of at least 50% by weight of the oxide of the metal whose salt is initially dissolved and exhibits a viscosity of at least about 8500 centipoises measured at room temperature.

2. A process for producing a positive hydroxylated ion base, water compatible clear liquid polymer containing at least 50% by weight of an inorganic oxide of a metal selected from the group consisting of metals whose hydrous oxides are precipitated at a pH more acid than 7 on treatment of aqueous solutions of salts of said metals with alkalies, which precipitates yield a pH of less than 7 after washing and dispersion in distilled water and exhibit a viscosity in such clear liquid in the range of 0.35 to $1.0 \times 10^6$ centipoises, from which solid inorganic polymer products may be prepared which comprises: dissolving a water soluble salt of said metal and of an aliphatic carboxylic acid in water; clarifying the resultant solution to thereby remove extraneous undissolved solids and gases therefrom; thereafter subjecting the resultant clarified liquid to vacuum evaporation at a temperature range of 15 to 25° C. such that volatile constituents are removed; continuing the vacuum evaporation of said liquid until the liquid contains the equivalent of at least 50% by weight of the oxide of the metal whose salt is initially dissolved; thereafter replacing the vacuum with a controlled atmosphere consisting predominantly of vapor selected from the group consisting of vapor of carboxylic acid and mixtures of such vapor and noble gas and raising the temperature to a level between 60 and 90° C.; maintaining the liquid under the controlled atmosphere and at a temperature between 60° C. and 90° C. for a period of 2 to 20 minutes, and then cooling such liquid to room temperature while maintained under said controlled atmosphere.

3. The process of claim 1 wherein the salts of at least two of said metals are initially dissolved to yield a liquid polymer containing compounds of both of said metals.

4. The process of claim 1 wherein at least one of said metals is a metal which forms a weakly acidic hydrous oxide and at least one metal is a metal whose oxide is distinctly basic, the latter being present in no more than a minor amount sufficient to complex and stabilize the weakly acidic oxide.

5. The process of claim 1 wherein the carboxylic acid is one which exhibits a dissociation constant for the first hydrogen not less than $1.5 \times 10^{-5}$.

6. The process of claim 1 wherein in lieu of vacuum evaporation at a temperature in the range of 15° to 25° C. the clarified solution is concentrated first by gentle heating to temperatures between 60° C. and 90° C. under atmospheric pressure.

7. A process for producing a clear liquid polymer containing at least 50% by weight of an oxide of a metal selected from the group consisting of metals whose hydrous oxides are precipitated at a pH more acid than 7 on treatment of aqueous solutions of aliphatic carboxylic acid salts of said metals with alkalies, which precipitates yield a pH of less than 7 after washing and dispersion in distilled water and in which the aliphatic carboxylic acid in said salt is selected from the group consisting of aliphatic carboxylic acids exhibiting a dissociation constant for the first hydrogen not less than $1.5 \times 10^{-5}$ which process comprises:
 (1) dissolving said water soluble metal aliphatic carboxylate salt in water,
 (2) clarifying the resultant solution to thereby remove extraneous undissolved solids and gases therefrom,
 (3) evaporating the clarified solution at a temperature between about 60° C. and 90° C. until the liquid reaches a concentration equivalent to about 60% of metal oxide,
 (4) permitting the resultant gel to stand undisturbed in a covered vessel at room temperature for between 24 and about 48 hours; and
 (5) recovering the liquid polymer having a viscosity of about 450,000 centipoises, so produced.

8. The process of claim 7 wherein the metal salt is zirconium acetate and the original solution contains approximately 11% zirconium oxide by weight.

9. The process of claim 7 including in addition the step of drawing said liquid polymer into fibers.

10. A single phase liquid polymer suitable for the preparation of solid inorganic polymers which consists essentially of a liquid polymer having a metal oxide content equivalent to at least 50% by weight of said metal oxide, the metal being selected from the group of metals defined in claim 1.

11. Polymers based on positive hydroxylated metal ions derived from an oxide of a metal selected from the group consisting of metals whose hydrous oxides are acidic and consisting essentially of single phase liquid polymers having viscosities in the range of 0.35 to $1.0 \times 10^{6}$ centipoises at room temperature and consisting of units whose chain lengths exceed at least 1,000 molecules per chain.

12. Liquid polymers based on positive hydroxylated metal ions derived from an oxide of a metal selected from the group consisting of metals whose hydrous oxides are acidic and consisting essentially of single phase liquids exhibiting viscosities between about 8500 centipoises and 10,000 centipoises at room temperature and consisting of units whose chain lengths are from about 8 to 10 molecules in the chain.

13. Optically clear liquid polymers exhibiting viscosities in the range of 0.35 to $1 \times 10^{6}$ centipoises at room temperature and based on metal oxide selected from the group consisting of metal oxides represented by the general formulas $MO_2$ and $M_2O_3$ and an aliphatic carboxylic acid, the relative molar proportions of metal oxdie to carboxylic acid being as follows: between 4 to 1 and 2 to 1 with $MO_2$ and between 8 to 1 and 2 to 1 with $M_2O_3$ and wherein M represents a metal selected from the group consisting of the metals whose hydrous oxides are precipitated at a pH more acid than 7 on treatment of aqueous solutions of aliphatic carboxylic acid salts of said metals with alkalies, which precipitates yield a pH of less than 7 after washing and dispersion in distilled water.

14. Liquid polymers and liquids of claim 13 containing in addition a minor proportion of metal oxide represented by the general formula MO wherein M represents an alkaline earth metal.

15. The liquid polymers of claim 13 wherein the acid is selected from the group consisting of formic and acetic.

16. A diluted liquid polymer comprising the liquid polymer of claim 11, diluted with an added amount of alkyl carboxylic acid insufficient to depolymerize the resulting liquid product.

17. The method of forming solid articles from the liquid polymers of claim 12 which comprises forming a thin body of said liquid polymers and subjecting said body to temperatures between about 70° C. and about 120° C. in an atmosphere consisting essentially of at least one gas selected from the group consisting of noble gases and vapors of aliphatic carboxylic acids, and continuing such heat treatment until said solid non-liquid article is obtained.

18. The process of claim 17 wherein the last body which is heat treated is a filament formed by extrusion and attenuation.

19. The method of forming solid inorganic transparent articles from liquid polymers which includes subjecting the liquid polymers of claim 10 to temperatures sufficient to remove completely all organic portions of the polymer, yielding a solid transparent flexible article.

20. A solid transparent article comprised of a polymer chain of positive hydroxylated metal ions as defined in claim 2 stabilized by the presence of minor amounts of aliphatic carboxylic acid radical whose dissociation constant for the first hydrogen is not less than $1.5 \times 10^{-5}$.

21. Solid, transparent, continuous individual monofilaments characterized by a circular to ovoid cross-section, uniform diameters of at least 0.5 micron, and semi-infinite lengths relative to said diameter of uniform cross-section, comprised of a multiplicity of submicroscopic metal oxide crystals of at least one metal oxide of a metal whose hydrous oxide is acidic and in which the length, breadth, and thickness of said submicroscopic crystals are substantially equivalent to each other and in which the length of the filament is semi-infinite relative to the size of such submicroscopic particle.

(References on following page)

References Cited by the Examiner

UNITED STATES PATENTS

| | | | |
|---|---|---|---|
| 2,289,286 | 7/42 | Mazabraud | 260—448 |
| 2,298,464 | 10/42 | Burwell | 23—140 |
| 2,595,415 | 5/52 | Schmerling | 23—141 |
| 2,681,922 | 6/54 | Balthis | 260—2 |
| 2,708,203 | 5/55 | Haslam | 260—2 |
| 2,744,074 | 5/56 | Theobald | 260—2 |
| 2,841,470 | 7/58 | Berry | 106—39 |
| 2,915,475 | 12/59 | Bugosh | 106—39 |
| 2,918,484 | 12/59 | Huehn | 260—448 |
| 2,984,628 | 5/61 | Alexander et al. | 252—313 |
| 3,024,199 | 3/62 | Pasfield | 252—313 |
| 3,026,177 | 3/62 | St. Pierre et al. | 23—142 |
| 3,026,210 | 3/62 | Coble | 106—39 |

FOREIGN PATENTS

| | | |
|---|---|---|
| 452,065 | 8/36 | Great Britain. |
| 535,850 | 4/41 | Great Britain. |

TOBIAS E. LEVOW, *Primary Examiner.*

JOSEPH REBOLD, *Examiner.*